Patented Feb. 10, 1942

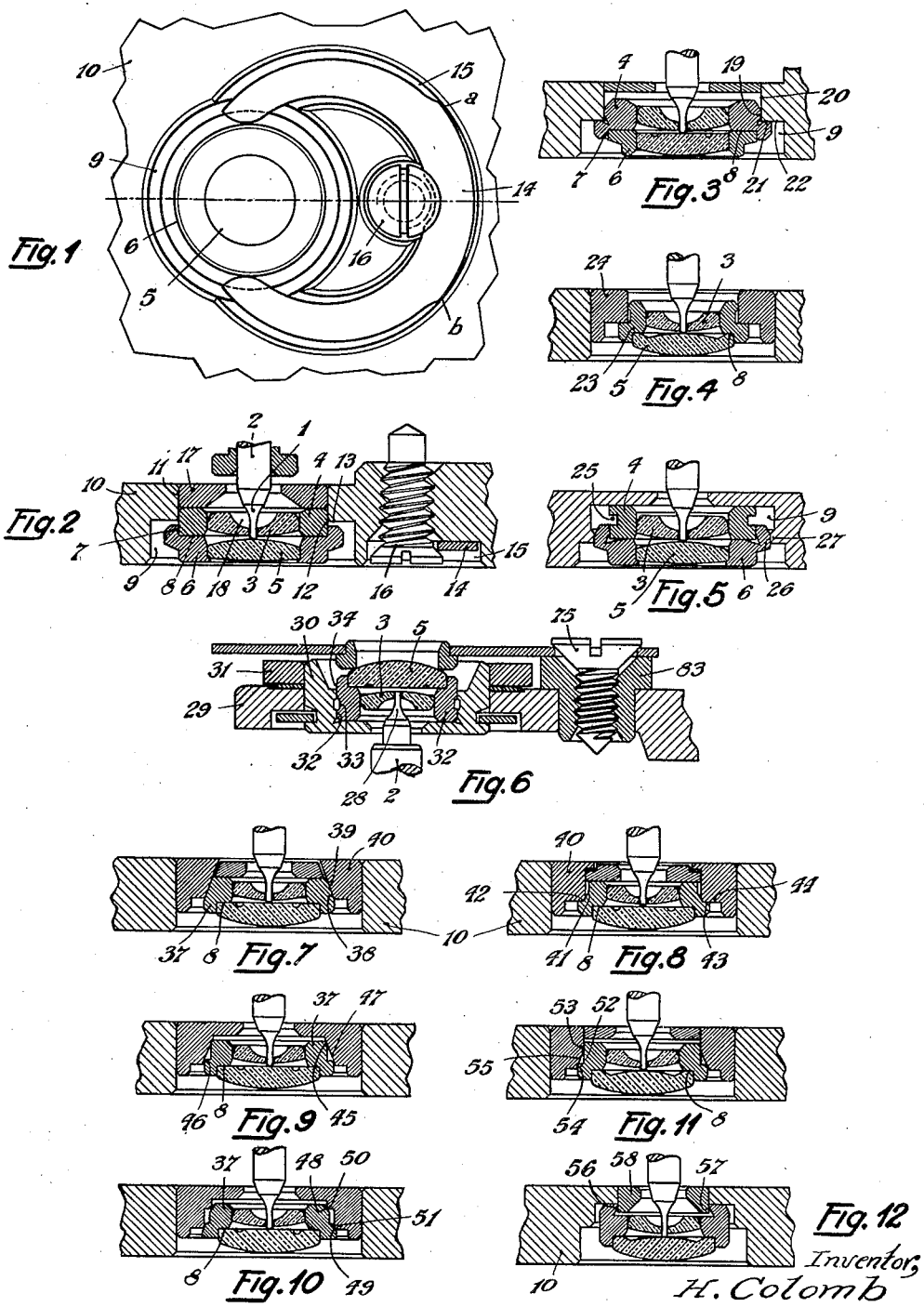
Feb. 10, 1942.   H. COLOMB   2,272,546
FIXED BEARING FOR THE PIVOTS OF CLOCKWORK SPINDLES
Filed May 1, 1939   2 Sheets-Sheet 1

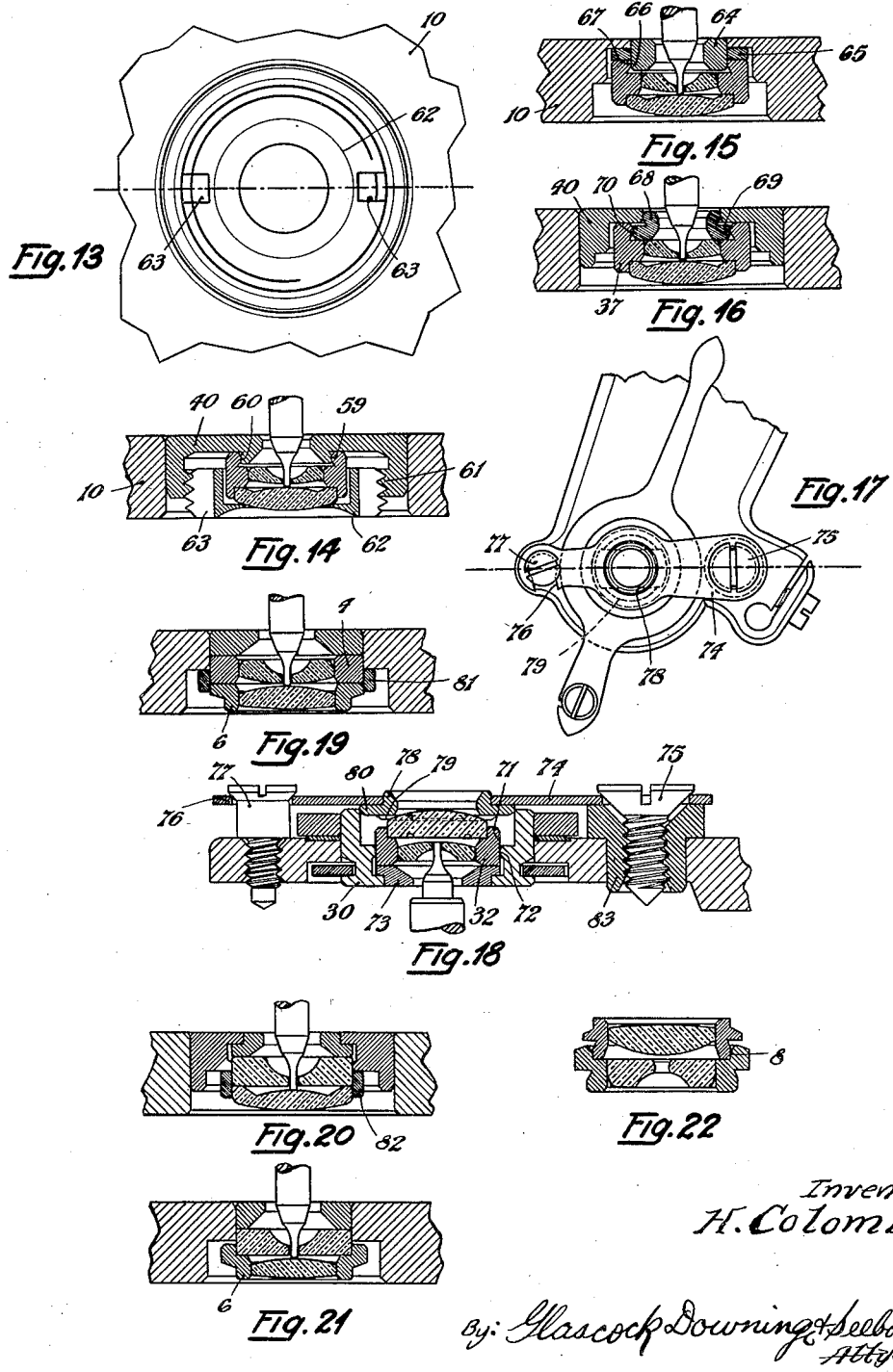

2,272,546

UNITED STATES PATENT OFFICE 2,272,546

FIXED BEARING FOR THE PIVOTS OF CLOCKWORK SPINDLES

Henri Colomb, Lausanne, Switzerland

Application May 1, 1939, Serial No. 271,146
In Switzerland May 12, 1938

6 Claims. (Cl. 58—140)

The present invention relates to a fixed bearing for the pivot of a clockwork spindle, of the type including a perforated bearing member receiving the pivot and a cap bearing member serving as abutment for said pivot, the two bearing members being detachably mounted in the relatively fixed bearing support.

It is an object of this invention to provide said two bearing members located in said support so as being therefrom independently assembled with each other to a single structure.

A further object of the invention is the provision, that said two members can only axially be disconnected.

Other objects are the provision of mutually co-operating circular elements on said bearing support and on said structure for centering the latter and the provision of fixing means acting upon said cap bearing member for retaining said bearing structure in the support.

In the drawings:

Fig. 1 is an underside view of the bearing showing a first embodiment,

Fig. 2 is an axial sectional view thereof,

Figs. 3, 4 and 5 show each an axial sectional view of a modification,

Fig. 6 is an axial sectional view according to a second embodiment,

Figs. 7 to 16, inclusive, represent similar views of modifications thereof,

Fig. 17 is a plan view according to a third embodiment,

Fig. 18 is an axial sectional view thereof drawn on double scale,

Figs. 19 to 22, inclusive, represent similar views of further modifications.

Referring to the Figs. 1 and 2 showing a first embodiment of the invention, 1 represents the lower pivot of the axle 2 of a balance wheel. 3 indicates a perforated jewel and 5 a cap jewel inserted with a tight fit into the frame rings 4 and 6 respectively. The ring 6 is provided with a circular recess 7 adapted to freely engage the ring 4 which is slightly less in diameter. This arrangement presents the advantage that the perforated bearing member and the cap member form a single bearing structure 8 which can be assembled without depending upon the relatively fixed bearing support, and said members can only be axially disconnected. The frame ring 6 is located loosely in an enlarged circular releasing chamber 9 of the pillar plate 10 forming a part of the bearing support and does not touch the wall of said chamber, while the assembled bearing structure 8 is centered and adjusted in a cylindrical bore 11 of said pillar plate by means of the frame ring 4 of which the outer peripheral face 12 freely contacts with the cylindrical wall portion of said bore. A leaf spring 14 is set in a circular groove 15 of the pillar plate 10 and bears thereon at $a$ and $b$. This spring, as shown, is fixed to said pillar plate by means of a screw 16 and comprises two arms which resiliently engage against the frame of the cap jewel in two diametrically opposite points and consequently act to force the bearing aggregate 8 upwardly against a ring 17 forming another part of the bearing support and inserted with a tight fit into the bore 11 to a level which determines the exact axial elevation of said structure within the bearing cavity. A free space 13, to allow for clearance, must be maintained between the bottom of the releasing chamber 9 and the frame 6 of the cap jewel.

By loosening the screw 16, the leaf spring 14 can be easily taken off and the bearing structure 8 be removed from the cavity in order to refill the desired quantity of oil. For cleaning purpose and replacing of jewels, the two bearing members may be disconnected by removing them axially. When the bearing structure 8 has been re-assembled so that the perforated member is in exact mesh with the cap member, the oiling will be performed in the following manner: The oil is dropped into the bore of the perforated jewel and falls on the cap jewel which, for this purpose, has to rest on a work bench or can be held in place by any convenient device. This arrangement permits the two jewels to maintain their true relative position as if they were assembled within the bearing support, and in consequence the bearing oil will be preserved and kept intact by capillarity between said jewels what would not be the case if the oil were supplied to the separated jewels. In fact, the bearing oil dropped on a single jewel of whatever shape must be limited to a very small quantity in order to avoid the oil getting into contact with the frame where it would be quickly absorbed, and which would be detrimental to the good running of the watch movement and particularly to the good state of the pivot. Prior to re-assembling the bearing, the cavity of the bearing support and the pivot 1 will be properly cleaned together with the bearing structure 8, and said structure having been oiled in the described manner may then be replaced into the bearing support. As a result of this arrangement it will be seen that the oiling advantageously takes place on the assembled bearing structure before replacing the same into the bearing support, the oiling being therefore rendered independent from said support. The inclination of the axle 2 of the balance wheel is limited within the bore of the ring 17 so as to facilitate the replacing of the bearing structure.

In the modification shown in Fig. 3, the circular recess 7 is disposed on the frame ring 4 and the frame ring 6 fits freely but comparatively snugly therein. For the purpose of centering the bearing structure 8, the frame ring 4 is provided with a small cylindrical surface 19 adapted to register with the cylindrical wall portion of the bore 20 of the pillar plate and said bore opens into an enlarged circular releasing chamber 9 in which the annular floor space 22 coacts with a transverse abutting surface 21 of the frame ring 4 so as to determine the exact axial elevation of the bearing structure 8 within the bearing support.

In the modification shown in Fig. 4, the cap member 5 is set directly in the circular recess of the frame ring 23 carrying also the perforated jewel 3. The assembled bearing structure 8 is located in an annular supporting ring 24 which is firmly pressed into the pillar plate and has its lower end cut out. Both, the frame ring 23 and the supporting ring 24 are provided with a pair of coacting cylindrical surfaces and transverse abutting surfaces which serve to center the bearing structure 8 and to keep it on the perfect true level within the bearing cavity as in the case of the preceding example.

In the modification represented in Fig. 5, the frame ring 6 carrying the cap jewel 5 meshes with the frame ring 4 as already shown in the embodiment first described. Said frame ring 4 is mounted either freely or for heavy frictional contact in the frame ring 6; in the latter instance any convenient tool adapted to engage the slot 25 of the frame ring 4 may be used to separate the frames. In this modification the cylindrical surface of the bearing structure 8 which coacts with a cylindrical wall portion 27 of the bearing cavity 9 to center said structure within said cavity is disposed on the frame ring 6, and the precise axial elevation of the structure is determined by the abutting of two transverse surfaces provided by the upper frontal face of the frame ring 4 and the bottom of the bearing cavity respectively.

The embodiment shown in Fig. 6 is described as applied to the upper pivot 28 of the axle 2 of a balance wheel. In the said figure, 29 represents the movement bridge and 31 the regulator placed upon the socket 30 by a press-fit or other connection so as to be rigid therewith and forming a support for the bearing structure. Said structure comprises a single frame ring 32 carrying the perforated jewel 3 and freely engaging the cap jewel 5 by means of a circular recess as already shown in the modification of Figure 4. The frame ring 32 has an elongated cylindrical portion of precise diameter, which is cut out in its outer peripheral face to form a circular groove 33 with adjacent cylindrical surfaces 34 and 35 adapted to co-operate with two corresponding cylindrical surfaces of the bearing cavity for centering purpose. The lower frontal face of the frame ring 32 abuts the bottom surface of said cavity so as to determine the exact axial elevation of the bearing structure which is held in place by a leaf spring 36 fixed by suitable means to a threaded barrel 83 inserted with a tight fit into the movement bridge. In the present instance the leaf spring 36 and the barrel 83 are secured together by a screw 75 which can slightly be loosened to allow the removal of said spring and hence the removal of the bearing structure from the support.

In the modifications shown in Figures 7 to 16, inclusive, the perforated jewel is again fixed in a frame ring 37 having a circular recess to engage the cap jewel which fits comparatively snugly but freely therein. The assembling of the two members of the bearing structure is thus always rendered independent from the bearing support and said members can only be axially disconnected. The differences distinguishing said modifications from each other reside in the different means provided to obtain the perfect centering of the bearing structure and to maintain its frame ring on the true level within the cavity of the bearing support. In the Figure 7 the frame ring has a circular centering surface 38 of conical shape coacting with a corresponding conical surface 39 of the supporting ring 40, while a tapering ring is seated on the bottom of the coniform bearing cavity and is slightly immerged therein with respect to the upper face of the support. In the Figure 8 the frame ring has a conical centering surface 41 of circular form cooperating with a circular rounded edge 42 of the support 40. Said edge could also be sharp or bevelled. A transverse surface 43 of the frame ring abuts a corresponding transverse surface 44 of the support so as to keep the bearing structure on the true level while contributing simultaneously to its centering. The transverse abutting surfaces shown in this example might also be used for trueing the frame ring and its support. In the modification illustrated in Figure 9 the frame ring 37 is shown having on its outer peripheral face two circular rounded edges 45 and 46, which could also be sharp or bevelled, co-operating with a conical centering surface 47 of the support. In Figure 10 the frame ring 37 is provided with two small conical surfaces 48 and 49 circular in form and adapted to register with two circular edges 50 and 51 respectively of the support, whereby said edges may be either sharp or rounded or bevelled. In the modification of Figure 11 the frame ring 52 fits freely within a cylindrical bore of the support by means of a cylindrical surface 52 conforming to the cylindrical wall portion 53 of said bore, whereby a circular rounded edge 54 of said frame co-operates with a conical surface 55 of said support in order to determine the true level of the bearing structure while simultaneously contributing to its centering. In Figure 12 the frame ring is shown having an internal cylindrical surface 56 adapted to register with the external peripheral face 57 of a cylindrical barrel 58 inserted with a tight fit into the pillar plate 10, and the upper frontal face of said frame bears against the bottom surface of the bearing cavity. In the modification shown in Figures 13 and 14 the frame ring is again provided with an internal cylindrical surface 59 precisely fitting to the external peripheral surface 60 of a projection formed on the supporting ring 40 and extending downwardly into said frame. The inside of the supporting ring is threaded at 61 to accommodate a sleeve 62 having a perforated bottom tapered in cross section and adapted to resiliently engage against the cap member so as to hold the bearing structure in true position. The sleeve 62 is provided with two longitudinal slots 63 to facilitate its screwing on and unscrewing. The modification of Figure 15 shows a barrel inserted with a tight fit into a perforated disk 65. One end 64 of said barrel is detachably mounted in a bore of the piller plate, while the other end freely engages the frame ring by means of an external cylindrical surface 66 contacting with an internal cylindrical wall portion 67 of said frame of which the upper frontal face abuts the disk 65 itself held in place by the plate end of the bearing cavity. If desired, the disk 65 might be made a part of the barrel, but for manufacturing reasons is preferably made separate therefrom as shown in the present instance. In Figure 16 the pillar plate again includes a support 49 and the barrel is shown having an upper cylindrical portion 68 detachably adjusted in the central bore of said support and a lower annular portion of larger diameter held by the plate end of the bearing cavity and forming an external cylindrical centering surface 69 coacting with an internal cylindrical surface 70 of the frame ring 37.

The third embodiment given in the Figures 17 and 18 is shown as applied to the upper pivot of the axle of a balance wheel and resembles to the embodiment illustrated in Figure 6. In said third embodiment as well as in its modifications hereinafter described, the perforated jewel is fixed to a frame ring 32 while the cap jewel is loosely mounted in said ring without clearance. The frame ring 32 is centered in the socket 30 by means of the external cylindrical surface 71 registering with an internal cylindrical surface 72 of said socket and rests with its base on a removable retaining ring 73 which is concentrically supported within said socket by a projecting annular shoulder extending outwardly from said ring. 74 indicates a spring in tension having one end fixed to the treaded barrel 83 rigid with the movement bridge, by a screw 75, while the other end thereof which is slightly smaller engages a stop screw 77 screwed fast into said bridge. Both screws can be slightly loosened, and a notch 76 provided in the smaller end of the spring serves to release the latter from engagement with the screw 77 for being turned round the opposite screw 75 so as to free the bearing structure for removal from the bearing cavity. The middle portion of the spring 74 carries a washer 78 riveted thereto and having two projections 79 disposed diametrically opposite each other which bear against the cap jewel. The lower end of the washer 78 forms an annular shoulder 80 freely engaging with the releasing chamber of the socket 30 so as to hold said washer stationary during loosening or tightening of the screws 75 and 77.

In the modification shown in Fig. 19, the frame rings 4 and 6 are mounted in a collar 81 and so arranged therein that at least one of them may be axially removable. If, for instance, the frame 4 has been inserted with a tight fit or been snugly adjusted within said collar, the other frame 6 is preferably set in freely for frictional contact. The collar might also be slotted, if desired, to resiliently engage the two bearing members. In the modification of Fig. 20 the collar 82 is shown carrying the perforated jewel and the cap jewel without frames, whereby the perforated jewel bears against a removable retaining ring as already shown in the Figures 17 and 18. It will be seen that the bearing members might also be formed by metal pieces instead of jewels, and is in all the embodiments and modifications hereinbefore described. The Figure 21 discloses a frame ring 6 already shown in the Figures 1 and 2, and the perforated jewel fits therein without intermediary frame. Finally the Figure 22 shows a bearing structure 8 including two frames frictionally engaging each other and having an outer flanged portion of which the two opposite transverse faces determine a small interstice for engaging a tapered tool so as to facilitate the disconnecting of the two members.

While the represented examples show some preferred forms of the invention, it is understood that other constructions and combinations of parts may be made which fall within the scope of the appended claims. Moreover, the invention is not necessarily restricted to the axle of a balance wheel; it may be successfully applied to other movements of the stated type, for instance to the axle of an escapement wheel.

I claim:

1. In a clockwork movement, the combination with a relatively fixed bearing support, said support having a recess with an aperture and an intermediate ring fitted in said aperture, of a spindle penetrating into said recess of the support through said ring, the inside diameter of the latter being wider than the spindle diameter thereabout, so as to limit the inclination of the spindle, a perforated bearing member receiving the pivot of said spindle and consisting of a frame ring and a perforated jewel inserted therein with a tight fit, a cap bearing member abutting against said pivot, one of said members being recessed to form a lodgment for engaging the other of said members, said two members being detachably mounted in said support and therefrom independently assembled with each other to a single bearing structure and being only axially separable, said support and said bearing structure including each, on the one hand, at least a cylindrical surface mutually co-operating for centering said structure in the support and, on the other hand, means mutually co-operating for determining the exact axial elevation of said bearing structure within the support, and fixing means applied against said cap bearing member for retaining said bearing structure in true position in the support.

2. Fixed pivot bearing for a clockwork spindle, comprising a fixed bearing support having a recess with an aperture, a supporting ring firmly pressed into said aperture to form a substantial part of said support and having at its inner circumference an annular projection extending downwardly into said recess, a perforated bearing member consisting of a frame ring having a recess and of a perforated jewel firmly inserted in said frame ring and receiving the pivot of said spindle, a cap bearing member consisting of a cap jewel freely fitting in the recess of said frame ring and abutting against said pivot, said frame ring having at its top an annular projection adapted to engage the annular projection of the supporting ring whereby the perforated bearing member and the cap bearing member are detachably mounted in the supporting ring and therefrom independently assembled with each other to a bearing structure so as being only axially separable, said supporting ring and said bearing structure including each a cylindrical surface disposed on the annular projections thereof and adapted to mutually cooperate for centering said structure in the support, and further including each a transverse abutting surface mutually cooperating for determining the exact axial elevation of said structure within the support, and fixing means including a sleeve screwed into said supporting ring and having a perforated bottom applied against said cap jewel for retaining said bearing structure in true position in the support.

3. Fixed pivot bearing as claimed in claim 2, characterized in that said fixing sleeve has a perforated bottom which is elastic.

4. In a clockwork movement, the combination with a relatively fixed bearing support, said support having a recess with an aperture, of a supporting ring firmly pressed into said aperture to form a substantial part of said support and carrying an intermediate ring fitted in said supporting ring at the top thereof, a spindle penetrating through said rings into the recess of said support, the inside diameter of said intermediate ring being wider than the spindle diameter thereabout so as to limit the inclination of the spindle, a perforated bearing member consisting of a frame ring having a recess and of a perforated jewel firmly inserted in said frame ring and receiving the pivot of said spindle, a cap bearing member consisting of a cap jewel freely fitting in the recess of said frame ring and abutting against said pivot, said two members being detachably mounted in the supporting ring and therefrom independently assembled with each other to a bearing structure and being only axially separable, said supporting ring in the support and said bearing structure including each a cylindrical surface mutually cooperating for centering said structure in the support, and further including a substantially conical surface and a substantially rounded edge mutually cooperating for determining the exact axial elevation of said structure within the support while simultaneously contributing to the centering of said structure, and resilient fixing means applied against said cap jewel for retaining said bearing structure in true position in the support.

5. Fixed pivot bearing for a clockwork spindle, comprising a fixed bearing support, a perforated bearing member receiving the pivot and consisting of a first frame ring and a perforated jewel inserted therein with a tight fit, a cap bearing member abutting against the pivot and consisting of a second frame ring and a cap jewel inserted therein with a tight fit, one of said frame rings being recessed to detachably engage the other frame ring whereby the perforated bearing member and the cap bearing member are assembled with each other to a bearing structure independently of the bearing support and are only axially separable, engageable means provided on said structure for facilitating the axial separation of said two bearing members, said support and said structure including each a cylindrical surface mutually cooperating for centering the structure in the support, and further including each a transverse abutting surface mutually cooperating for determining the exact axial elevation of said structure within the support, and resilient fixing means applied against said cap bearing member for retaining said structure in true position in the support.

6. Fixed pivot bearing for a clockwork spindle comprising a fixed bearing support, a perforated bearing member receiving the pivot and consisting of a frame ring and a perforated jewel inserted therein with a tight fit, a cap bearing member abutting against the pivot, one of said members being recessed to form a lodgment for detachably engaging the other of said members whereby to permit said members to be substantially assembled independently of the bearing support to a single bearing structure and to be only axially separable from each other, said support and said structure including each, on the one hand, a cylindrical surface mutually cooperating for centering said bearing structure in said support and, on the other hand, means mutually cooperating for determining the exact axial elevation of said bearing structure within said support, and fixing means applied against said cap bearing member for retaining said bearing structure in position within said support.

HENRI COLOMB.